No. 607,659. Patented July 19, 1898.
R. H. LANGDALE.
SUPPLEMENTARY HORSESHOE.
(Application filed Jan. 15, 1898.)
(No Model.)
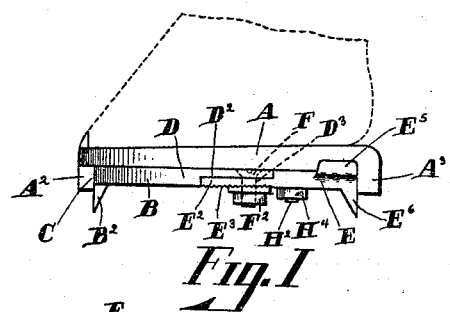
*Fig. 1.*
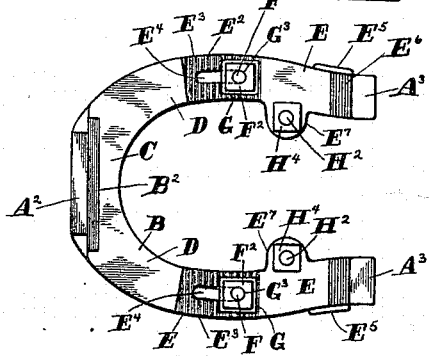
*Fig. 2.*
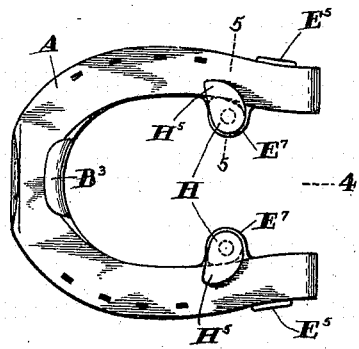
*Fig. 3.*
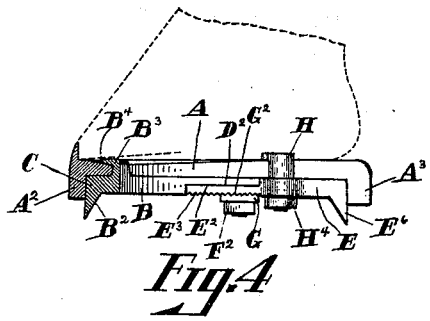
*Fig. 4.*
*Fig. 6.*
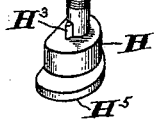
*Fig. 7.*
*Fig. 5.*
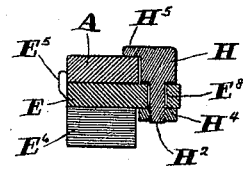
*Fig. 8.*
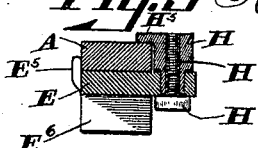
WITNESSES
Wm. E. Jones
N. Smith
INVENTOR
Rupert H. Langdale,
per
Wm. Hubbell Fisher,
Attorney.

UNITED STATES PATENT OFFICE.

RUPERT H. LANGDALE, OF CINCINNATI, OHIO.

SUPPLEMENTARY HORSESHOE.

SPECIFICATION forming part of Letters Patent No. 607,659, dated July 19, 1898.

Application filed January 15, 1898. Serial No. 666,749. (No model.)

*To all whom it may concern:*

Be it known that I, RUPERT H. LANGDALE, a citizen of the United States, and a resident of the city of Cincinnati, in the county of Hamilton and State of Ohio, have invented certain new and useful Improvements in Horseshoes, of which the following is a specification.

The several features of my invention and the various advantages resulting from their use, conjointly or otherwise, will be apparent from the following description and claims.

In the accompanying drawings, making a part of this specification, and in which similar letters of reference indicate corresponding parts, Figure 1 is a side elevation of my supplementary shoe applied to an ordinary shoe and showing the hoof in dotted lines. Fig. 2 is an inverted plan view of the same. Fig. 3 is a plan view omitting the hoof, showing the shoes as they would appear when placed in working position on the ground and viewed from above. Fig. 4 is a transverse vertical section taken in the plane of the dotted lines 4 4 of Fig. 3 and also showing the outline of the hoof in dotted lines. Fig. 5 is a detail section through one of the clamps, the section being taken in the plane of the dotted line 5 5 of Fig. 3. Fig. 6 is a perspective view of the eccentric-clamp inverted, including its shank, Fig. 7 is a plan detail of the hole through which the shank of the eccentric-clamp is received. Fig. 8 is a sectional view showing a modification of the detail shown in Fig. 5.

My invention relates to certain valuable improvements in supplementary horseshoes capacitated, first, for attachment to an ordinary horseshoe and also for detachment from the latter.

My invention has special reference to the method and means whereby this supplementary shoe can be correctly adjusted to the ordinary shoe and firmly secured thereto and at will detached therefrom.

I will now proceed to describe my invention in detail.

A indicates an ordinary shoe fitted to the hoof of the draft-animal. In my supplementary or under shoe, B indicates the main body of the shoe, consisting of a toe portion C and the side portions D. The toe portion C is made flat for a greater or lesser portion of its length to allow the toe-calk of the ordinary shoe to lie flat against it. The side portions D are duly curved to conform to the general outline of the sides of the lower portion of the hoof. These side pieces D do not extend back for the entire length of the shoe, for to their rear portions are respectively connected the end pieces E in a manner which admits of each rear piece being adjusted nearer to or farther from its adjacent side D, as desired, and of accomplishing this result without essentially weakening the connection. The preferred mode of making this connection is novel and consists as follows: The side portion D is cut away at $D^2$, and an extension part or plate $E^2$ from the adjacent rear piece E fits against the portion D where it is cut away. The parts $D^2$ and $E^2$ together equal substantially the thickness of the rest of the portion D and of the piece E. The under side of the extension $E^2$ has transverse corrugations $E^3$ and a longitudinal slot $E^4$. A screw-bolt F, having a suitable head countersunk in the upper face of the part D, passes through a close-fitting hole $D^3$ in the part $E^2$ and extends down and through the slot $E^4$. There is also present a setting or locking piece G, having corrugations $G^2$ in its upper side adapted to enter the channels of the corrugations $E^3$ of the piece $E^2$ and engage with the corrugations of the latter. The bolt F passes through a close-fitting hole $G^3$ in the locking-piece G and below the latter receives the nut $F^2$.

Each piece E has an upwardly-extending flange $E^5$ located at its outer edge to assist in preventing this under shoe from slipping laterally on the first shoe A, and in connection with the devices now to be described constitutes a clamp. Each piece E is provided with a lug $E^7$. In a hole $E^8$ thereof is received the shank $H^2$ of an eccentric H. This hole has a series of recesses $E^9$, each adapted to receive in turn a lug $H^3$ on the shank $H^2$. The lower portion of the shank is screw-threaded and thereon is received a nut $H^4$, which when tightened holds the eccentric to place and prevents it from rising out of its place. The upper end of the eccentric is provided with a horizontally-extending flange $H^5$.

Each piece E is provided with a calk $E^6$. The toe portion of the body B of the under shoe has a calk $B^2$. Inasmuch as this under shoe is of especial advantage on slippery roads and places the calks $E^6$ and the calk $B^2$ are made sharp, substantially as shown. This toe portion of the body B of the under shoe is provided at its inner edge with a flange $B^3$, extending up and then forward, as shown, forming a recess $B^4$, shaped to receive closely the inner edge portion of the toe part of the shoe A. This shoe A may be plain, but will ordinarily be provided with the customary calk $A^2$ at front and the ordinary calks $A^3$ $A^3$ at rear.

It will be understood that the shoe A is in position on the foot of the draft-animal.

In applying my improved under shoe to the shoe A, I proceed as follows: I place the under shoe up against shoe A and move the under shoe forward, so that the toe portion of shoe A enters the recesses $B^4$ of the body B. The nuts $F^2$ are now loosened and the pieces E retracted until they abut against the calks $A^3$. Each locking-piece G is now adjusted so that its corrugations $G^2$ will engage the corrugations $E^3$ of the adjacent extension $E^2$ and the adjacent nut $F^2$ is tightened. The eccentrics H are elevated until the lugs $H^3$ thereof are above their respective holes $E^8$ and are then turned until the shoe A is clamped tightly between the eccentric and the adjacent flange $E^5$ of piece E. Should the shoe A be a little narrow, &c., the eccentrics will still clamp in relation to one another. The eccentrics are now loosened, and the flange or lug $H^3$ of the shank $H^2$ will enter the adjacent recess $E^9$ of the hole $E^8$. Each nut $H^4$ is now tightened, and each clamp is securely held in place. The flange $H^5$ duly overlaps the shoe A. Thus the under shoe is readily applied and securely fastened to the shoe A.

Whenever it is desired to remove the under shoe from shoe A the foregoing operations will be reversed.

In localities where the primary shoes used vary greatly in thickness a convenient mode of holding the eccentric-clamp in place is illustrated in Fig. 8. There the nut $H^4$ is dispensed with, and in its place I employ a screw-bolt having shank $H^7$, having a head $H^8$, capable of being grasped and turned by a wrench. The screw-shank $H^7$ enters an interiorly-screw-threaded recess in the shank of the eccentric-clamp and screws therein.

What I claim as new and of my invention, and desire to secure by Letters Patent, is—

1. A supplementary horseshoe having a body B, with calk $B^2$, means for connecting it at front to the shoe A, and the pieces E, having the extensions $E^2$, slotted and provided with corrugations, and the locking-piece G, and bolt and nut, and clamps respectively located at the inner side of the shoe and adapted to independently engage the upper shoe, substantially as and for the purposes specified.

2. A supplementary horseshoe having a body B, with calk $B^2$, means for connecting it at front to the shoe A, and the pieces E, having the extensions $E^2$, slotted and provided with corrugations, and the locking-piece G, and bolt and nut, and the clamps, each consisting of an eccentric, having a shank $H^2$, and screw-tightening device, and flange $H^5$, substantially as and for the purposes specified.

3. A supplementary horseshoe having a body B, with calk $B^2$, means for connecting it at front to the shoe A, and the pieces E, having the extensions $E^2$, slotted and provided with corrugations, and the locking-piece G, and bolt and nut, and the clamps, each consisting of an eccentric, having a shank $H^2$, and screw-tightening device, and flange $H^5$, a flange $E^5$ of the piece E being present, substantially as and for the purposes specified.

4. A supplementary horseshoe having a body B, with calk $B^2$, means for connecting it at front to the shoe A, and the pieces E, having the extensions $E^2$, slotted and provided with corrugations, and the locking-piece G, and bolt and nut, and the clamps, having an eccentric and a shank $H^2$, provided with lug $H^3$ and adapted to fit a hole $E^8$, $E^9$, of the piece E, and a screw-tightening device, and a flange $H^5$ of the eccentric for overlapping the shoe, substantially as and for the purposes specified.

5. A supplementary horseshoe having a body B, with calk $B^2$, means for connecting it at front to the shoe A, and the pieces E, having the extensions $E^2$, slotted and provided with corrugations, and the locking-piece G, and bolt and nut, and the clamps, having an eccentric and a shank $H^2$, provided with lug $H^3$ and adapted to fit a hole $E^8$, $E^9$, of the piece E, and a tightening device, and a flange $H^5$ of the eccentric for overlapping the shoe, the piece E having a flange $E^5$, substantially as and for the purposes specified.

6. A supplementary shoe having a toe-recess, and the movable pieces E, adjustable relatively to the body of the shoe, and means for locking them in place, and eccentrics, and means for locking them, and clamping the pieces E to the upper or primary shoe, substantially as and for the purposes specified.

7. A supplementary horseshoe having a body B, with calk $B^2$, means for connecting it at front to the shoe A, and the pieces E, having the extensions $E^2$, slotted and provided with corrugations, and the locking-piece G, and bolt and nut, and the clamps, each consisting of an eccentric, having a shank $H^2$, and screw $H^7$, $H^8$, substantially as and for the purposes specified.

RUPERT H. LANGDALE.

Attest:
 JOHN H. COSTELLO,
 K. SMITH.